US007142523B1

(12) United States Patent
Chekuri et al.

(10) Patent No.: US 7,142,523 B1
(45) Date of Patent: Nov. 28, 2006

(54) METHODS AND APPARATUS FOR DESIGN, ADJUSTMENT OR OPERATION OF WIRELESS NETWORKS USING PRE-FREQUENCY-ASSIGNMENT OPTIMIZATION

(75) Inventors: Chandra S. Chekuri, Highland Park, NJ (US); Lawrence M. Drabeck, Oceanport, NJ (US); Yihao Lisa Zhang, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1454 days.

(21) Appl. No.: 09/628,378

(22) Filed: Jul. 31, 2000

(51) Int. Cl.
*H04Q 7/20* (2006.01)
(52) U.S. Cl. .................... 370/328; 370/437; 455/446
(58) Field of Classification Search ............... 370/319, 370/328–330, 343, 344, 437; 455/446, 447, 455/67.7, 466
See application file for complete search history.

(56) References Cited

U.S. PATENT DOCUMENTS

| 5,293,640 | A |   | 3/1994  | Gunmar et al.       |         |
|-----------|---|---|---------|---------------------|---------|
| 5,404,574 | A | * | 4/1995  | Benveniste          | 455/447 |
| 5,483,667 | A | * | 1/1996  | Faruque             | 455/447 |
| 5,497,503 | A | * | 3/1996  | Rydberg et al.      | 455/454 |
| 5,561,841 | A | * | 10/1996 | Markus              | 455/446 |
| 5,710,758 | A |   | 1/1998  | Soliman et al.      |         |
| 5,835,859 | A | * | 11/1998 | Doner               | 455/447 |
| 5,949,988 | A |   | 9/1999  | Feisullin et al.    |         |
| 6,097,708 | A | * | 8/2000  | Mao                 | 370/329 |
| 6,128,497 | A | * | 10/2000 | Faruque             | 455/447 |
| 6,370,384 | B1| * | 4/2002  | Komara              | 455/447 |
| 6,560,459 | B1| * | 5/2003  | Wong                | 455/447 |
| 6,611,500 | B1| * | 8/2003  | Clarkson et al.     | 370/252 |
| 6,631,267 | B1| * | 10/2003 | Clarkson et al.     | 455/446 |

FOREIGN PATENT DOCUMENTS

| EP | 802695 A2   | * | 10/1997 |
|----|-------------|---|---------|
| EP | 0 847 213 A2|   | 6/1998  |
| EP | 847213 A2   | * | 6/1998  |
| EP | 1 098 544 A2|   | 5/2001  |
| EP | 1 098 545 A2|   | 5/2001  |
| EP | 1 098 546 A2|   | 5/2001  |
| WO | WO 94/03986 |   | 2/1994  |
| WO | WO 99/39531 |   | 8/1999  |

OTHER PUBLICATIONS

Egner, W. A. et al. "Dynamic Enhanced Radio Resource Allocation for Wireless Communication Networks". 48th IEEE Vehicula Technology Conference, 1998. Ottawa, Canada. May 18-21, 1998. vol. 3. pp. 1700-1704.*
Scherer, D. "Optimizing Frequency Re-use in Point-to-Multipoint Deployments". IEEE Radio and Wireless Conference, 2000. Denver, CO. Sep. 10-13, 2000. pp. 83-86.*
Planet Tool, Mobile Systems International, http://www.rmrdesign.com/msi, 1999.
Asset Tool, Aircom, http://www.aircom.co.uk, 1999.

* cited by examiner

*Primary Examiner*—Seema S. Rao
*Assistant Examiner*—Donald Mills

(57) ABSTRACT

Techniques for use in designing, adjusting or operating a wireless network so as to provide a desired level of performance for the network. An optimization process is applied to a set of information characterizing the network. The optimization process includes at least a pre-frequency-assignment optimization stage, which is applied prior to assignment of frequencies to one or more communication channels of the wireless network. An output of the optimization process is utilized to determine one or more operating parameters of the wireless network, such as a base station transmit power or antenna orientation.

25 Claims, 4 Drawing Sheets

METHODS AND APPARATUS FOR DESIGN, ADJUSTMENT OR OPERATION OF WIRELESS NETWORKS USING PRE-FREQUENCY-ASSIGNMENT OPTIMIZATION

CROSS-REFERENCE TO RELATED APPLICATION

The present invention is related to the invention described in U.S. patent application Ser. No. 09/628,366 entitled "Methods and Apparatus for Design, Adjustment or Operation of Wireless Networks Using Multi-Stage Optimization," filed concurrently herewith in the name of inventors C. S. Chekuri et al.

FIELD OF THE INVENTION

The present invention relates generally to wireless communication networks, and more particularly to techniques for use in the design, implementation and operation of such wireless networks.

BACKGROUND OF THE INVENTION

A typical wireless network includes a multitude of interconnected base stations providing wireless traffic to a varying number of fixed or mobile users distributed over a geographically well-defined coverage area. The wireless interface generally has to operate under conditions including demand for multiple access to the network, uncontrollable signal propagation, and a limited bandwidth. The demand for multiple access to the network means that location and time of service requests are not known a priori. Therefore, the network has to provide the required level of service with sufficient capacity over a large geographical area. The above-noted uncontrollable signal propagation condition indicates that a wireless link between a base station and a user relies on signal propagation in an environment that is typically associated with high propagation loss, and reflection, diffraction, or scattering effects at clutter, terrain, and other types of obstacles.

The combination of these conditions often results in competing design goals. For example, demand for high capacity within a limited bandwidth generally requires operating with high spectral efficiency. This leads to reduced orthogonality among communication channels, resulting in mutual interference due to their overlapping propagation paths in the environment. This interference reduces network coverage area or, equivalently, lowers quality of service. Therefore, the requirement for high area coverage or high quality of service always competes against the demand for high network capacity.

In time division multiple access (TDMA) or frequency division multiple access (FDMA) systems, spectral efficiency can be increased by reducing the frequency reuse factor. This also reduces the average physical distance between cells operating at the same frequency and therefore increases their mutual interference. In code division multiple access (CDMA) systems, the various communication channels are distinguished by codes. Due to propagation effects in the environment, orthogonality between codes may be washed out, such that interference between communication channels increases with traffic load.

Besides spectral efficiency, the amount of traffic that can be handled by the network highly depends on how well the spatial distribution of capacity matches that of the offered traffic load. This sets an additional constraint on allocating and sizing cells in the network, which, of course, is highly dependent on the local propagation environment.

Other constraints that can influence network performance include, e.g., time-dependent variations of the traffic pattern, hardware limitations, external interference effects like thermal noise, and morphological issues like requirements for building penetration.

A multitude of other system parameters also have to be considered when a network is designed or adjusted. These parameters include, e.g., base station locations, number of sectors per base station, antenna parameters such as height, orientation, tilt, antenna gain, and antenna pattern, transmit power levels per communication channel and base station, frequency plan, handoff thresholds, and number of carriers per base station or sector.

There are underlying constraints associated with some of these parameters, such as base station locations or antenna heights, that may be predetermined by the local morphological environment, such as availability of real estate, high buildings for antennas, etc. In addition, certain parameters, such as antenna tilt or antenna orientation, can be easily adjusted in the design phase, but are cost- and time-intensive when they have to be changed afterwards. Other parameters, such as frequency plan, power levels and handoff thresholds, can easily be changed or tuned, even when the network is in service.

As a result of the complexity of the wireless environment, competing design goals such as demand for high capacity and high link performance, and the multitude of system parameters, network design and adjustment are difficult tasks.

Current procedures for network design include design tools that model network performance based on the given network parameters using statistical or other mathematical propagation models. An example of such a design tool is the Planet tool from Mobile Systems International, http://www.mrdesign.com/msi. These and other conventional network design tools calculate certain radio frequency (RF) link metrics, e.g., signal strength or signal-to-interference ratio, which are of significance for particular network performance attributes. The accuracy of these predictions mostly depends on the accuracy of the propagation models and the precision of modeling environmental elements such as terrain, clutter, etc.

Although these conventional tools can provide a sufficiently high accuracy in predicting network performance, they generally do not classify the overall network performance and, therefore, provide no information about how far the network is driven from its optimal state. Due to the complexity of the interactions in the network, tuning network performance has to be done by a trial-and-error procedure, and potential improvements have to be identified by comparing RF link-metric plots for different network configurations. With the number of network parameters that have to be adjusted and the different design goals, this procedure is very unsatisfactory and a performance optimum is difficult to even approach.

Other conventional network design tools include or otherwise utilize frequency planning algorithms. An example is the Asset network design tool, from Aircom International, www.aircom.co.uk, which incorporates a frequency planning algorithm. For TDMA and FDMA networks, i.e., networks that have a frequency reuse factor larger than one, many efforts have been made to generate frequency planning algorithms that improve the network performance with respect to its frequency plan. These algorithms usually have an objective that aims for improvement of spectral efficiency. Such an algorithm, for instance, may try to minimize the amount of frequencies used while serving a given traffic density. These algorithms, however, generally do not provide information about the network performance for each frequency plan, unless they have been linked to a network design tool such as the above-noted Planet tool.

A network design for a TDMA or FDMA wireless network is typically accomplished by first designing the network to meet a certain coverage criterion using a network design tool such as the Planet or Asset tools described previously. Then a frequency planning algorithm may be utilized to generate a frequency plan and minimize the interference. Once the frequency plan has been applied to the network design, the network interference can be determined by the network design tool. If necessary, further changes to the network can then be made by the system designer and evaluated by the network design tool.

Although many of the above-noted conventional techniques can provide assistance in designing and adjusting a network, they generally do not allow optimization of overall network performance for different mutually competing design goals.

A need therefore exists for further improvements in the process of characterizing, adjusting and optimizing wireless networks, particularly in the case of TDMA and FDMA wireless networks, as well as other types of wireless networks which implement frequency reuse.

SUMMARY OF THE INVENTION

The present invention provides improved techniques for designing, adjusting and/or operating a wireless network, and is particularly well suited for use with TDMA and FDMA wireless networks or other types of wireless networks which implement frequency reuse.

The inventors have recognized that the above-described conventional techniques exhibit a number of significant problems. For example, these techniques generally fail to provide a network design optimization process that can be efficiently and effectively implemented prior to the assignment of frequencies to channels of the communication system.

In accordance with one aspect of the invention, an optimization process is applied to a set of information characterizing a wireless network. The optimization process includes at least a pre-frequency-assignment optimization stage, which is applied prior to assignment of frequencies to one or more communication channels of the wireless network. The pre-frequency-assignment optimization stage may be configured to utilize a derivative-based optimization of a specified objective function, and may determine a particular network configuration for specified values of network capacity and network coverage. An output of the optimization process is utilized to determine one or more operating parameters of the wireless network, such as a base station transmit power or antenna orientation.

Advantageously, the invention substantially improves the process of designing, adjusting or operating a wireless network so as to achieve a desired level of performance.

DETAILED DESCRIPTION OF THE INVENTION

Figure 1:
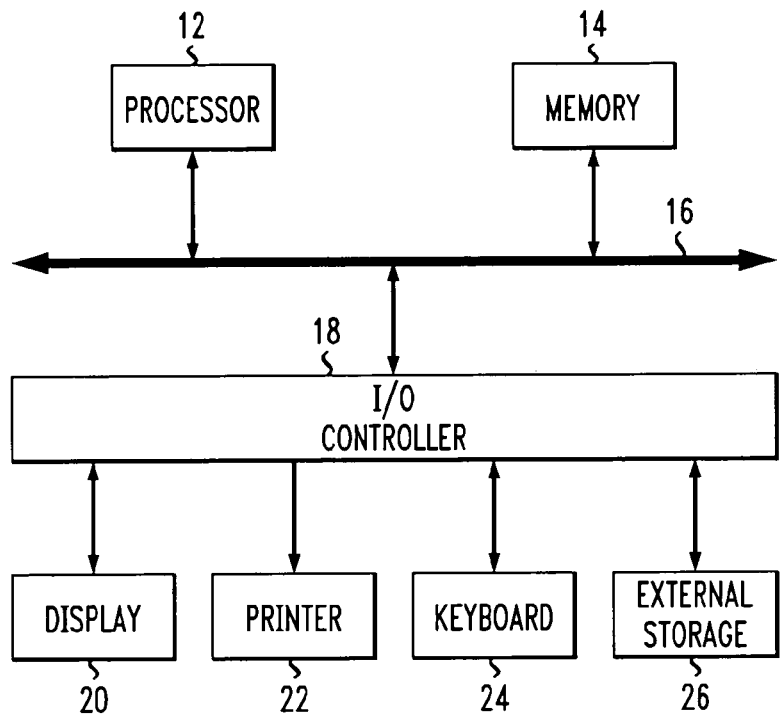
FIG. 1 is a block diagram of a processing system in which a wireless network optimization process may be implemented in accordance with the invention.

The present invention may be configured to utilize network information processing techniques described in the following U.S. patent applications: Ser. No. 09/434,578 entitled "Methods and Apparatus for Derivative-Based Optimization of Wireless Network Performance," Ser. No. 09/434,579 entitled "Methods and Apparatus for Characterization, Adjustment and Optimization of Wireless Networks," and Ser. No. 09/434,580 entitled "Road-Based Evaluation and Interpolation of Wireless Network Parameters," all of which were filed on Nov. 4, 1999 in the names of inventors K. L. Clarkson et al. These applications are assigned to the assignee of the present application, and are incorporated by reference herein.

The present invention will be illustrated below in conjunction with exemplary wireless network information processing techniques implemented in a computer-based processing system. It should be understood, however, that the invention is not limited to use with any particular type of processing system. The disclosed techniques are suitable for use with a wide variety of other systems and in numerous alternative applications. Moreover, the described techniques are applicable to many different types of wireless networks, including both TDMA and FDMA networks, as well as other types of networks which implement frequency reuse, such as CDMA or orthogonal frequency division multiplexed (OFDM) wireless networks having a frequency reuse factor greater than one, time division duplex (TDD) wireless networks, etc. The invention does not require any particular wireless network configuration, and may be applied to wireless networks with mobile subscriber units, fixed subscriber units or combinations of mobile and fixed units. The term "wireless network" as used herein is intended to include these and other types of networks, as well as sub-networks or other portions of such networks and combinations of multiple networks. The terms "optimize," "optimizing" and "optimization" as used herein should be understood to include any type of improvement or other adjustment in network performance, e.g., an improvement which provides performance deemed to be acceptable for a given application. These terms as used herein therefore do not require any type of true optimum or optimization, such as an actual minimum or maximum of a particular performance function.

The present invention is directed to a processor-implemented method and apparatus for designing, adjusting and/or operating a wireless network so as to optimize its performance, and is particularly well suited for use with TDMA and FDMA networks or other types of wireless networks which implement frequency reuse. The present invention may be implemented at least in part in one or more software programs running on a personal computer, workstation, microcomputer, mainframe computer or any other type of programmable digital processor. The invention in an illustrative embodiment to be described herein provides a general optimization process that may be used in conjunction with the design, adjustment or operation of a wireless network.

FIG. 1 shows an exemplary processing system 10 in which an optimization process in accordance with the present invention may be implemented. The processing system 10 includes a processor 12 and a memory 14, connected to communicate via a bus 16. The system 10 further includes an input/output (I/O) controller 18 which is connected to the bus 16 in order to communicate with the processor 12 and memory 14. The I/O controller 18 in conjunction with the processor 12 directs the operation of a number of peripheral components including a display 20, a printer 22, a keyboard 24 and an external storage device 26.

One or more of the elements of system 10 may represent portions of a desktop or portable personal computer, a workstation, a microcomputer, a mainframe computer, or other type of processor-based information processing device. The memory 14 and external storage device 26 may be electronic, magnetic or optical storage devices. The external storage device 26 may include a database of wireless network information, such as a database of information on wireless network operating parameters or the like, that is utilized to generate graphical displays such as sets of one or more tradeoff curves that will be described in greater detail below. The external storage device 26 may be a single device, or may be distributed, e.g., distributed across multiple computers or similar devices. The term "database" as used herein is intended to include any arrangement of stored data that may be used in conjunction with an optimization process used in network design, adjustment and/or operation.

The present invention may be implemented at least in part in the form of a computer software program stored in memory 14 or external storage 26. Such a program may be executed by processor 12 in accordance with user-supplied input data to produce a desired output in a predetermined format, e.g., on display 20 or on a print-out generated by printer 22. The user-supplied input data may be entered at the keyboard 24, read from one or more files of external storage device 26, or obtained over a network connection from a server or other information source.

As noted previously, the present invention provides improved optimization techniques for use in conjunction with the design, adjustment or operation of a wireless network. In the illustrative embodiment of the invention, a network optimization process is configured to optimize the performance of a wireless network for coverage and capacity. The optimization process may adjust network base station parameters such as base station transmit power, vertical and azimuthal antenna orientation, etc. in order to optimize the coverage and capacity of the network. Since capacity and coverage are principally independent properties, and network design generally involves a tradeoff between these properties, the optimization process of the illustrative embodiment may be configured to provide base station parameter settings for different combinations of capacity and coverage.

Figure 2:
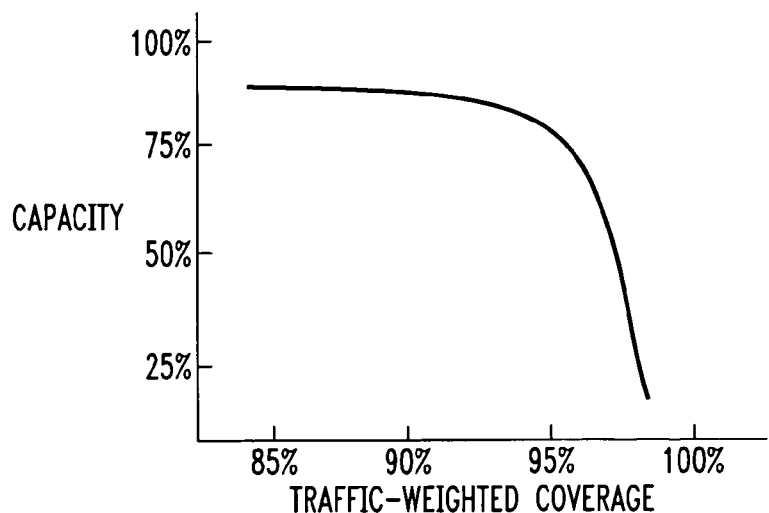
FIG. 2 shows an example of a tradeoff curve showing network capacity versus traffic-weighted coverage and generated in accordance with an optimization process of the present invention.

FIG. 2 shows an example of a tradeoff curve that may be generated using the processing system 10 of FIG. 1, illustrating the set of optimum tradeoff points between wireless network capacity and traffic weighted coverage in a particular network design. Additional details regarding this type of tradeoff curve can be found in the above-cited U.S. patent application Ser. No. 09/434,579 entitled "Methods and Apparatus for Characterization, Adjustment and Optimization of Wireless Networks." It is up to the network designer to determine at which point on this optimum tradeoff curve to design the wireless network. The illustrative embodiment of the present invention provides a multi-stage general optimization process which may be used to generate one or more tradeoff curves of the type shown in FIG. 2, and to otherwise assist the network designer in the determination of an appropriate network operating point.

General Optimization Process

Figure 3:
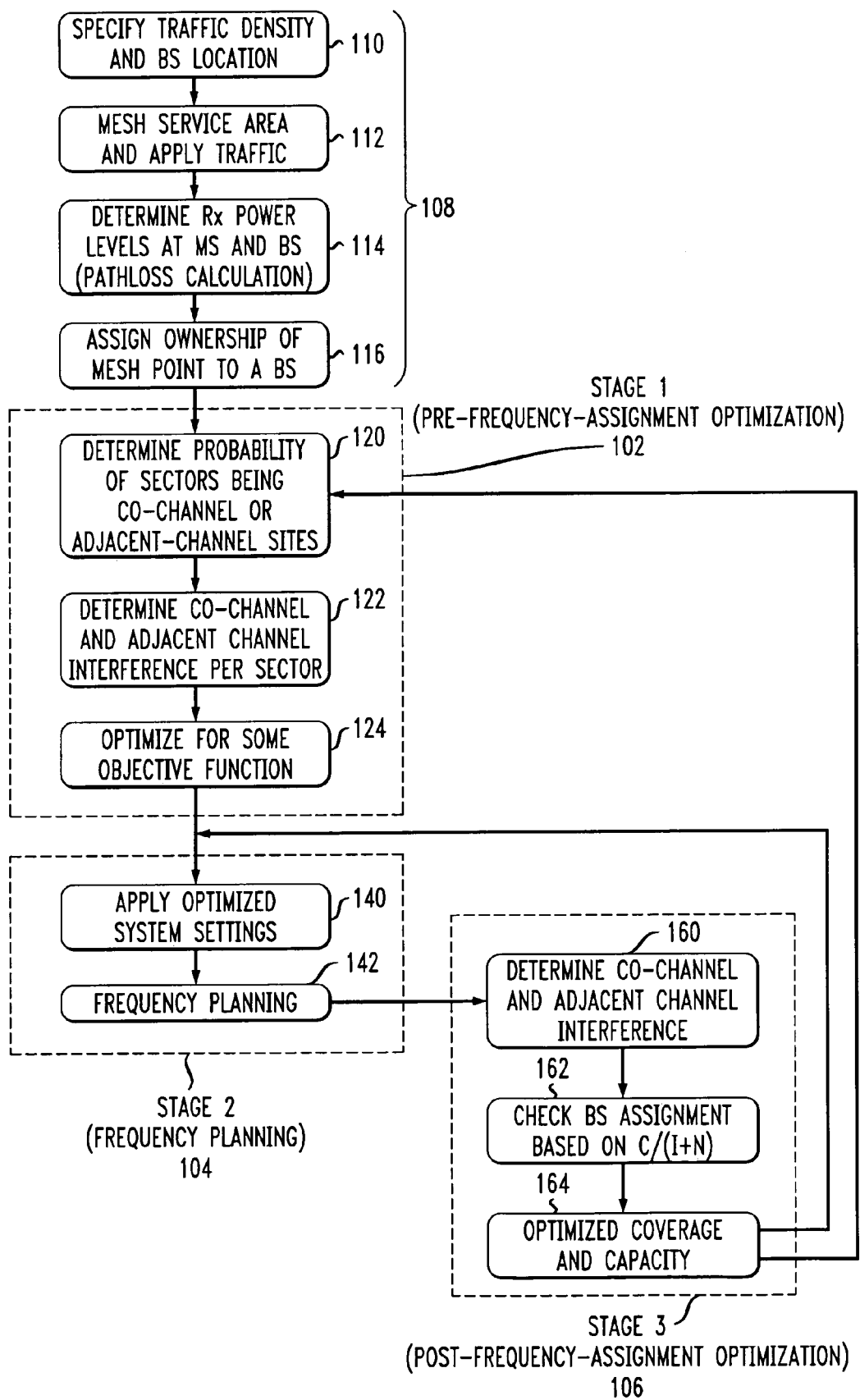
FIG. 3 is a flow diagram of a general optimization process in accordance with an illustrative embodiment of the present invention.

FIG. 3 is a flow diagram of the general optimization process in the illustrative embodiment of the invention. The general optimization process in this embodiment includes three primary stages, denoted Stage 1, Stage 2 and Stage 3. Stage 1 is a pre-frequency-assignment optimization stage and includes the set of steps 102, Stage 2 is a frequency planning stage and includes the set of steps 104, and Stage 3 is a post-frequency-assignment optimization stage and includes the set of steps 106.

Stage 1 of the multi-stage process in the illustrative embodiment generally involves minimizing the co-channel and adjacent channel interference while maintaining a given level of coverage and blocking prior to the frequency planning stage. Advantageously, this pre-frequency-assignment optimization will generally lead to a better frequency plan, with a lower interference level for a given frequency reuse factor or a lower reuse factor for a given interference level, than that provided using conventional techniques. Stage 2 is a frequency planning stage configured to take advantage of the network settings determined in Stage 1. Stage 3 uses the frequency plan determined in Stage 2 to further minimize the interference while maintaining coverage for a given quality of service. This three-stage optimization process of the present invention can provide significantly improved configurations for the network relative to those obtainable using conventional techniques. More particularly, generating a better frequency plan by using the Stage 1 optimization will generally lead to a better network design in the Stage 3 optimization.

Additional iterations of the three stages can be implemented in order to further optimize the network.

The general optimization process of FIG. 3 also includes a set of preliminary steps 108. These preliminary steps 108 include steps 110 through 116 as shown. In step 110, the traffic density and base station (BS) locations in a given wireless network characterization, adjustment or optimization application are specified. It is assumed for purposes of illustration that the objective of the process is to determine an optimal design for a wireless network as part of a network design process, although it will be apparent to those skilled in the art that the techniques are also applicable to other applications, such as adjustment or operation of an existing wireless network. The service area under consideration is then meshed in step 112, i.e., reduced to a mesh representation comprising a set of interconnected points. In step 114, the receive power levels at a particular mobile station (MS) and base station are determined in accordance with a path-loss calculation. Ownership of each point in the mesh as generated in step 112 is then assigned to a particular base station, as indicated in step 116.

After completion of the set of preliminary steps 108, the pre-frequency-assignment optimization steps 102 of Stage 1 can begin. In step 120, the probability of certain sectors being co-channel or adjacent-channel interferers is determined. The co-channel and adjacent channel interference for the configuration is then determined in step 122. The network is then optimized based on a specified objective function in step 124. The pre-frequency-assignment optimization of Stage 1 assumes a certain probability of frequency channel assignments for each of a number of sectors of the wireless network, and then optimizes the network based on these assumptions, using a derivative-based optimization algorithm.

The pre-frequency-assignment optimization stage will be described in greater detail in a separate section below.

The frequency planning of Stage 2 begins by applying system settings in step 140. The applied settings may be optimized system settings representing an output of Stage 1 or Stage 3. In an embodiment of the invention in which the process starts with Stage 2 and includes one or more iterations of the Stage 2 and Stage 3 processing operations, the applied settings may be a set of original network settings. After the settings are applied, a frequency assignment is determined in frequency planning step 142. The frequency assignment in step 142 can be accomplished using any of a number of well-known conventional frequency planning algorithms, such as the frequency planning tool that is part of the previously-described Asset network design tool from Aircom International.

The post-frequency-assignment optimization of Stage 3 is initiated after the completion of the frequency assignment step 142. In step 160, the co-channel and adjacent channel interference associated with the particular frequency assignment are determined. The assignment of mesh points to base stations are then checked in step 162 based on a measure of carrier to interference plus noise (C/I+N). Finally, an optimized coverage and capacity are determined in step 164. Advantageously, the post-frequency-assignment optimization stage of the process can further improve the network design, since the frequency assignment and thus the interference sources are known. In addition, the designer at this point has a better understanding of the blocking characteristics of the network, which leads to better traffic load balancing.

The post-frequency-assignment optimization stage will also be described in greater detail in a separate section below.

As previously noted, the three-stage optimization process of FIG. 3 can also be implemented in an iterative manner. For example, the process can be run in a loop in order to determine the most optimum configuration for the network. Such a loop could include performance of Stages 1, 2 and 3 of the process followed by one or more additional performances of Stages 1, 2 and 3. As another possibility, the loop could include performance of Stages 1, 2 and 3 followed by one or more additional performances of Stages 2 and 3 only.

It should be noted that, for existing networks that need to be optimized and in other applications, one may run a Stage 3 optimization on the present network configuration. For example, it is possible to start the optimization process with Stage 3 and then iterate Stages 2 and 3. Such an embodiment of the invention may include only Stages 2 and 3. Results have shown that such an embodiment of the present invention can produce a well-optimized network. Therefore, in these and other cases, it may not be necessary to perform a Stage 1 optimization.

The optimizations in Stages 1 and 3 of the general optimization process may make use of the derivative-based optimization process described in the above-cited U.S. patent application Ser. No. 09/434,578 entitled "Methods and Apparatus for Derivative-Based Optimization of Wireless Network Performance," Ser. No. 09/434,579 entitled "Methods and Apparatus for Characterization, Adjustment and Optimization of Wireless Networks," and Ser. No. 09/434,580 entitled "Road-Based Evaluation and Interpolation of Wireless Network Parameters." For example, a derivative-based optimization process described in these applications allows one to optimize an objective function of a network performance metric with respect to a number of mathematically continuous network tuning parameters, such as, e.g., base station transmit power, antenna vertical and azimuthal orientation, etc. Other known optimization techniques can also be used in conjunction with the multi-stage general optimization process of the present invention.

Pre-Frequency-Assignment Optimization (Stage 1)

The pre-frequency-assignment optimization stage of the general optimization process of FIG. 3 will now be described in greater detail. The objective of this stage in the illustrative embodiment is to optimize the base station parameters prior to the frequency assignment in order to obtain the lowest frequency reuse or lowest interference level possible. This process is complicated by the fact that the frequency assignment is not known a priori, but the interference must nonetheless be estimated in order to optimize the network. It is therefore necessary to assume a certain frequency pattern or reuse in order to calculate the corresponding co-channel and adjacent-channel interference. At this point in the process in the illustrative embodiment, the base station locations and the number of frequencies that each base station will require are known. The number of frequencies determines the maximum traffic $A_i$ that each base station can handle.

For purposes of illustration only, it will be assumed that the wireless network under consideration is a TDMA or FDMA network. Those skilled in the art will recognize that the techniques described are also applicable to other types of networks.

In the forward or reverse link of a TDMA or FDMA network, the coverage is usually defined as the received signal level being above a given threshold and the carrier to interference ratio (C/I) also being above a given threshold. This allows the network to decode the received signal with an acceptable bit error rate (BER) or frame error rate (FER) and thus reconstruct the information sent. The conditions can be stated as:

$$C > \beta_C \text{ and } C/I > \alpha_{C/I}, \quad (1)$$

where C is the received signal level at the antenna port of either the mobile station or the base station, I is the interference to the received signal C (defined below), $\beta_C$ is the threshold for coverage, and $\alpha_{C/I}$ is the threshold for interference level.

The C and C/I thresholds may be different for the forward and reverse link. A given location $x=(x,y)$ is considered covered if both C and C/I are above threshold and is considered not covered if either of C or C/I is below threshold. This may be represented by $$Cov(\underline{x}) = \qquad (2)$$

$$\theta(C(\underline{x}) - \beta_C) \cdot \theta(C/I(\underline{x}) - \alpha_{C/I}) = \begin{cases} 1 \text{ if location } \underline{x} \text{ covered} \\ 0 \text{ if location } \underline{x} \text{ not covered} \end{cases}$$

where the theta function θ is defined as $$\theta(\text{arguments} \geq 0) = 1 \text{ and } \theta(\text{arguments} < 0) = 0. \qquad (2a)$$

The overall network coverage can then be determined by integrating over the target coverage area $$C_{tot} = \frac{\int_{\underline{x}} Cov(\underline{x}) \cdot d\underline{x}}{\int_{\underline{x}} d\underline{x}}, \qquad (3)$$

where X is the entire design area. Alternatively, the overall traffic-weighted coverage can be defined by:

$$C_{tot} = \frac{\int_{\underline{x}} TD(\underline{x}) \cdot Cov(\underline{x}) \cdot d\underline{x}}{\int_{\underline{x}} TD(\underline{x}) \cdot d\underline{x}}, \qquad (4)$$

where $TD(\underline{x})$ is the traffic density at position $\underline{x}$.

The integrals of Equations (3) and (4) can be replaced by sums if a discrete set of locations is evaluated rather than a continuum. This discrete set of locations is the mesh referred to in step 112 of FIG. 3. The number of locations should be large enough and dense enough for a statistical representative coverage evaluation. Alternatively, the evaluation can be done using a road-based mesh as described in the above-cited U.S. patent application Ser. No. 09/434,580 entitled "Road-Based Evaluation and Interpolation of Wireless Network Parameters."

The individual receiver input power levels referred to in step 114 of FIG. 3 can be obtained, e.g., from conventional network design tools, from in-field measurements, from network performance statistics, or from a combination of these and other techniques. The variable definition is as follows:

$F_i(\underline{x})$: Forward Link Power Received at antenna port of MS at position $\underline{x}$ from BS $b_i$ $F_{\underline{x}}(b_i)$: Reverse Link Power Received at BS $b_i$ antenna port from MS at position $\underline{x}$ One generally needs to determine if a position $\underline{x}$ receives a sufficient signal from a base station in the absence of interference to maintain a connection. If so, one also needs to determine the base station to which that mobile is assigned. The criterion for maintaining a connection is that at least one received base station signal is larger than a predefined threshold:

$$F_i(\underline{x}) > \beta_C, \qquad (5)$$

where $\beta_C$ is usually defined as the receiver minimum sensitivity plus a penetration margin. The maximum $F_i(\underline{x})$ that is above threshold is the base station to which that mobile position is assigned with probability 1. If no base station meets the threshold criterion then the assignment probability is 0. To summarize, the assignment probability at a given position $\underline{x}$ is $$p_B(b_i, \underline{x}) = \theta(\text{Max}[F_i(\underline{x})] - \beta_C). \qquad (6)$$

Since the mobile assignment is performed in the absence of interference, mobile assignment does not constitute a good link when interference is introduced.

The network capacity may be defined in the manner described in the above-cited U.S. patent application Ser. No. 09/434,578 entitled "Methods and Apparatus for Derivative-Based Optimization of Wireless Network Performance." In this case, the network capacity is given by $$\text{Network Capacity} = \tau^* \text{Network Coverage} \qquad (7)$$

where τ is the maximum multiplication factor for increasing the traffic density per sector uniformly that results in an overall pre-specified blocking rate (usually about 2%). A definition of the overall blocking rate will be given below.

The traffic in a given sector $b_i$ is $$A_i = \sum_{\underline{x} \in X} TD(\underline{x}) \cdot p_B(b_i, \underline{x}). \qquad (8)$$

The traffic load offered to the cell is $$L_i = \tau \cdot A_i (\text{in Erlangs}). \qquad (9)$$

One can therefore uniformly change the traffic load on all cells by changing τ.

The number of radios per sector and thus the number of traffic channels ($TC_i$) per sector is defined prior to optimization in the illustrative embodiment. For the pre-frequency-assignment optimization, if a sector has more than one radio and thus more than one frequency, the C/I of every frequency at a given position $\underline{x}$ in that sector will be the same since the sectors are all assumed to have the same probability of co-channel interference. With this information, one can calculate the blocking rate of sector $b_i$ using the well-known Erlang B model. The blocking probability per sector is $$Pr_i = \frac{\left(\frac{L_i^{TC_i}}{TC_i!}\right)}{\sum_{k=0}^{TC_i} \frac{L_i^k}{k!}}. \qquad (10)$$

The total overall blocking rate for the entire network is given by the ratio of the total amount of blocked traffic and the total traffic:

$$Pr = \frac{\sum_{i=1}^{N} L_i \cdot Pr_i}{\sum_{i=1}^{N} L_i}, \qquad (11)$$

where N is the total number of sectors. In general, it is desirable to keep the overall blocking rate to around 2% for most wireless network applications.

If the number of radio channels per sector is not known before pre-frequency-assignment optimization, one can still use the same formulation of Equations (8)–(11) by assuming that each sector has the same number of radio channels, e.g., each sector has two radio channels for a Global System for Mobile Communications (GSM) system. This will allow for a pre-frequency-assignment optimization to be preformed in the absence of radio channel information for the network. Knowing the number of radios channels per sector, and thus the traffic per sector, allows for a slightly more accurate pre-frequency-assignment optimization due to the traffic weighting of the C/I that is defined below.

One needs to determine the interference from co-channel and adjacent channel interferers to determine the C/I ratio. Since the frequency plan is not known a priori, assumptions about the sectors that may be co-channel and adjacent channel interferers to a given sector will have to be made. In one embodiment, one can assume the probability of being a co-channel sector is related to the distance from the "wanted" sector in question. The further from the wanted sector the more likely a sector will reuse the same frequency. This type of probability could be linear, quadratic, exponential or some other type of distribution that starts at low probability of being a co-channel interferer close to the sector in question and then increases to a maximum probability farther away from that sector.

Figure 4:
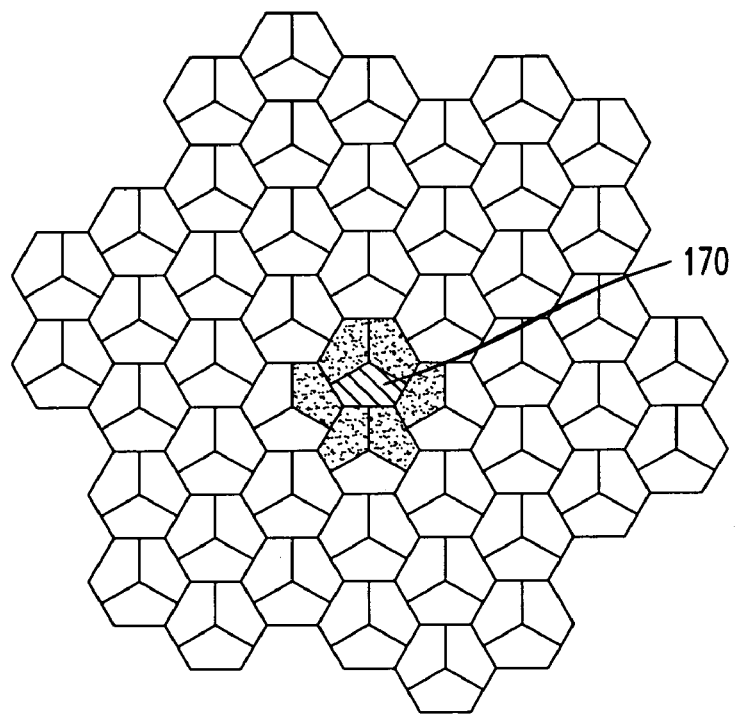
FIG. 4 shows a portion of an example wireless network illustrating a wanted sector and a number of excluded sectors as determined in the pre-frequency-assignment stage of the general optimization process of FIG. 3.

In another embodiment, one can exclude certain sectors from being co-channel sectors based on their geographic location and orientation relative to the sector in question and then define a probability distribution function for the remaining sectors. One potential configuration using this methodology is shown in FIG. 4. The central sector 170 represents the so-called "wanted" sector in which is located a mobile station for which the interference is to be calculated, and the surrounding shaded sectors are excluded sectors, i.e. have a probability of zero for being a co-channel sector. The remaining sectors shown in FIG. 4 could each have an equal probability of being a co-channel interferer or could each have a weighted probability of being a co-channel interferer that increases with the distance from the wanted sector. In this example, the excluded sectors include the co-located sectors, i.e., the sectors in the same cell as the sector in which the mobile station is located, and the first adjacent sectors, i.e., those sectors immediately adjacent to the sector in which the mobile is located. The first adjacent sector may be within the main lobe, e.g., within the 3 dB beamwidth of the sector in question, or the sector could share a common boundary with the wanted sector. This type of excluded set is consistent with the GSM 05.05 specification, Global System for Mobile Communications, "Digital cellular telecommunications system (Phase 2); Radio transmission and reception," European Telecommunication Standard (ETS) 300 577, 8th Edition, August 1996, which is incorporated by reference herein.

Once the probability of a sector being a co-channel interferer is defined, one can calculate the interference and thus the C/I ratio for the wanted sector. This leads to a C/I for the reverse link at a position $\underline{x}$ for base station sector $b_i$:

$$C/I(b_i, \underline{x}) = \frac{F_{\underline{x}}(b_i)}{\sum_{j \neq i} P_{co}(b_j) \cdot \left( \frac{\sum_{\underline{y} \in \underline{X}} TD(\underline{y}) \cdot p_B(b_j, \underline{y}) \cdot F_{\underline{y}}(b_j)}{\sum_{\underline{y} \in \underline{X}} TD(\underline{y}) \cdot p_B(b_j, \underline{y})} \right)}. \quad (12)$$

The denominator is the traffic weighted average interference from the mobiles in the other sectors. $P_{co}(b_j)$ is the probability of that other sector being a co-channel site. Similarly, the C/I for the forward link at a given position $\underline{x}$ is given by $$C/I(b_i, \underline{x}) = \frac{F_{b_j}(\underline{x})}{\sum_{j \neq i} P_{co}(b_j) \cdot F_{b_j}(\underline{x})}. \quad (13)$$

The probability function $P_{co}(b_j)$ in Equations (12) and (13) can also be used to scale the value of C/I. For example, if every sector had the same probability of being a co-channel site, one could set the probability to $1/12$ for every sector instead of 1. This would scale the C/I to be equivalent to a reuse of 12 frequency pattern.

Given the above definitions of coverage and C/I, one can apply a derivative-based network optimization as noted in step 124 of FIG. 3. This can be done in a number of different ways. For example, one can define a traffic density for the network and then optimize for the best coverage (i.e., maximize Equation (4)) at a given fixed system blocking level. The traffic level may then be varied to generate a tradeoff curve of different coverage levels versus different network capacities, as was previously described in conjunction with FIG. 2.

As another example, one can examine the tradeoff between maximizing the number of points where C is above threshold and the number of points where both C and C/I are above threshold. In this case, the resulting tradeoff curve is the percentage of area with C above threshold as a function of the percentage of that covered area that also has C/I above threshold. The percentage of covered points with C/I above threshold for the entire coverage area should be the traffic-weighted average of the C/I coverage. Therefore, the percentage of covered area with C/I above a given threshold (weighted by the traffic density) is given by $$C/I_{cov} = \frac{\sum_i \sum_{\underline{x} \in \underline{X}} p_B(b_i, \underline{x}) \cdot TD(\underline{x}) \cdot \Theta(C/I(b_i, \underline{x}) - \text{threshold})}{\sum_i A_i}. \quad (14)$$

Figure 5:
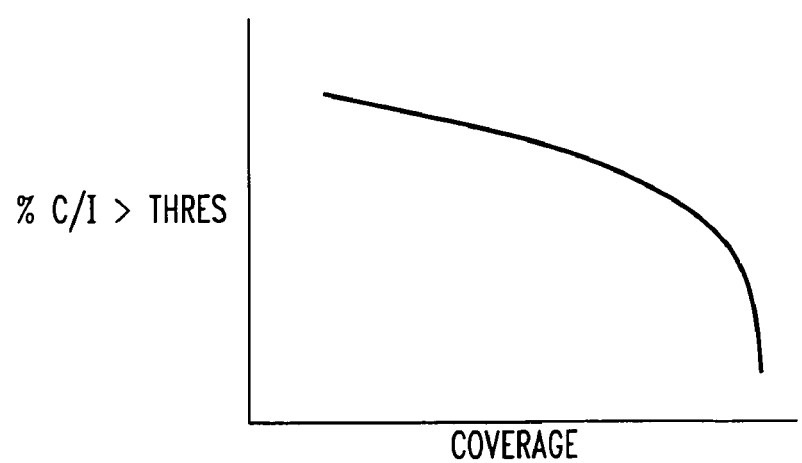
FIG. 5 is an example of a tradeoff curve showing percent carrier to interference (C/I) above threshold versus network coverage and generated in accordance with an optimization process of the present invention.

The function to be maximized is $$\alpha \cdot C/I_{cov} + (1-\alpha) \cdot \text{Cov}, \quad (15)$$

where $\alpha$ is used to weight the coverage versus the C/I of the covered points. Varying a results in a tradeoff curve of the type shown in FIG. 5.

Post-Frequency-Assignment Optimization (Stage 3)

As previously noted in conjunction with the general optimization process of FIG. 3, once the frequency assignment of step 146 has been completed, the interferers are known and the network can be further optimized in the post-frequency-assignment optimization stage. At this stage, it is possible to obtain a more accurate measure of the blocking and to optimize accordingly. The objective of this stage in the illustrative embodiment is to size the network cells such that the traffic capability of the base stations matches the traffic density function for the target blocking rate while also trying to maximize coverage.

Figure 6:
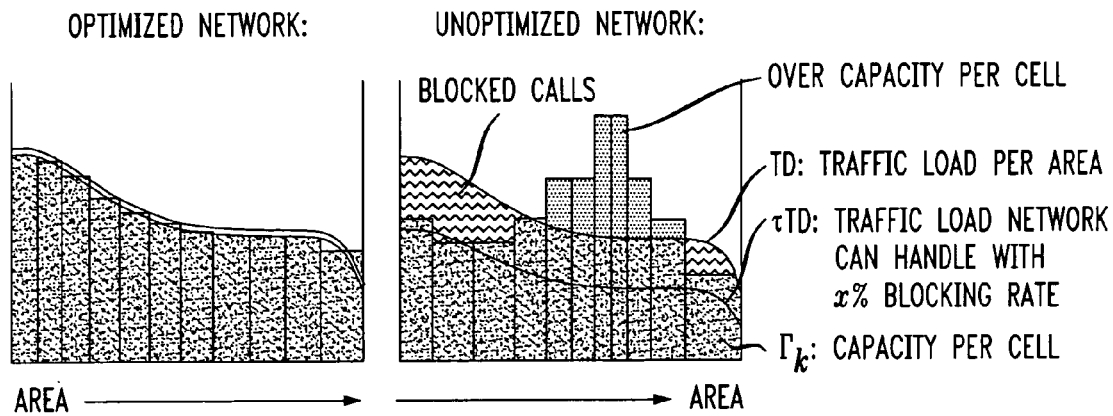
FIG. 6 shows plots of capacity as a function of coverage area for optimized and unoptimized networks.

FIG. 6 illustrates the above-described post-frequency-assignment optimization. It can be seen from the plot on the right side of the figure that in an unoptimized network, the curve for traffic load per area TD does not closely coincide with the curve for traffic load at an x % blocking rate τTD, and as a result there are significant amounts of blocked calls and over capacity per cell. The plot on the left side of the figure shows the corresponding optimized network, in which the curves closely coincide and the amount of block calls and over capacity are significantly reduced.

Since the frequency plan is complete at this stage in the process, one or more additional variables are available for the objective function to be optimized in step 164 of FIG. 3. Examples of possible objective functions for this post-frequency-assignment optimization are as follows: (1) capacity versus coverage tradeoff for a given number of radios per sector and given span of frequencies; (2) minimum number of frequencies or lowest reuse with a given capacity, coverage and number of radios; and (3) minimum number or radios for a given capacity, coverage and frequency span. Other objective functions could also be used.

Figure 7:
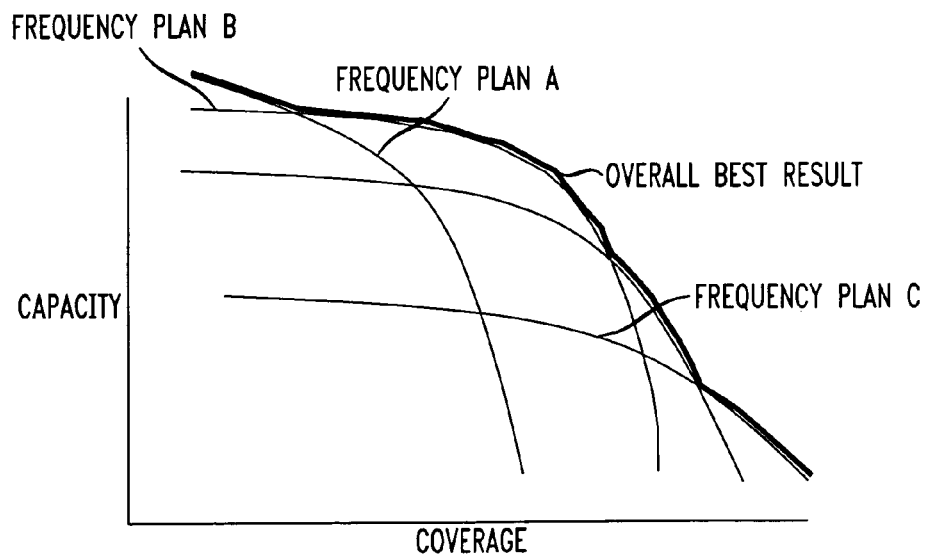
FIG. 7 shows capacity versus coverage tradeoff curves for a number of different frequency plans, as generated in accordance with an optimization process of the present invention.

FIG. 7 shows an example of a series of tradeoff curves based on different frequency plans. These curves are generated using objective function (1) above. Different sets of tradeoff curves are generated in this example for each of three frequency plans, i.e., frequency plan A, frequency plan B and frequency plan C. The overall best or optimum result may be a combination of the best results of all the different curves, as illustrated by the darker solid line in the figure. In this example, as many frequencies as possible have been allowed in a given span. As a result, one need not qualify each curve based on the best reuse since the capacity number will provide this information.

The coverage for the post-frequency-assignment optimization is as defined by Equations (1)–(4) above for the pre-frequency-assignment optimization. However, the definition of the C/I ratio in the post-frequency-assignment optimization is different than that used in the pre-frequency-assignment optimization.

For the forward link, the C/I ratio for sector $b_i$ at position $\underline{x}$ for frequency $f_k$ (which is part of the list of frequencies for sector $b_i$) is given by $$C/I_{b_i}(\underline{x}, f_k) = \frac{F_i(\underline{x})}{\sum_{j \in N_{f_k}} F_j(\underline{x}) + \sum_{j \in N_{f_k \pm 200\text{kHz}}} \frac{F_j(\underline{x})}{63.1}}. \quad (16)$$

Sector $b_i$ contains frequency $f_k$ and $N_{f_k}$ is the set containing all other sectors with the frequency $f_k$ (i.e., co-channels BS) while $N_{f_k \pm 200\ kHz}$ is the set containing all other sectors with adjacent channels to $f_k$ (i.e., $f_k \pm 200$ kHz). The above-noted GSM specifications indicate that the network can handle an adjacent channel that is 18 dB stronger than a co-channel with the same degradation in quality, and therefore in Equation (16) the adjacent channel is reduced by 18 dB (63.1) to make it a another co-channel interferer.

For the reverse link, the C/I ratio is determined by taking the weighted average of all the other co-channel and adjacent channel mobiles into the base station antenna:

$$C/I_{\underline{x}}(b_i, f_k) = \frac{F_{\underline{x}}(b_i)}{\sum_{j \in N_{f_k}} \left( \frac{\sum_{\underline{y} \in X} TD(\underline{y}) \cdot p_B(b_j, \underline{y}) \cdot F_{\underline{y}}(b_i)}{N_j \cdot \sum_{\underline{y} \in X} TD(\underline{y}) \cdot p_B(b_j, \underline{y})} + \sum_{j \in N_{f_k \pm 200\text{kHz}}} \frac{\sum_{\underline{y} \in X} TD(\underline{y}) \cdot p_B(b_j, \underline{y}) \cdot F_{\underline{y}}(b_i)/63.1}{N_j \cdot \sum_{\underline{y} \in X} TD(\underline{y}) \cdot p_B(b_j, \underline{y})} \right)}. \quad (17)$$

The coverage and blocking calculation for a TDMA or FDMA network are complicated by the fact that for a given position $\underline{x}$ within a sector that has more than one frequency channel, that position does not necessarily see the same C/I for each frequency. That means that all frequencies are received at position $\underline{x}$ with the same power (or same C) but receive different amounts of interference. Therefore, some frequencies may be above the C/I threshold and some may be below at the same position $\underline{x}$.

Figure 8:
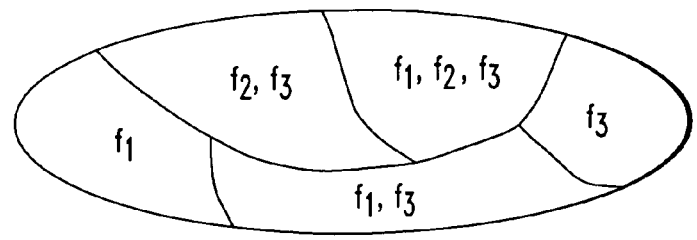
FIG. 8 illustrates an example of a situation in which a single sector includes regions with different sets of frequencies meeting a specified above threshold condition.

FIG. 8 depicts this situation for a single sector having three frequency channels denoted $f_1$, $f_2$, and $f_3$. The single sector as shown includes five regions. The frequencies shown in a given one of the regions indicate which of the three frequencies of the sector have C/I values above threshold within the given region. In this example, each of the regions receives a different set of frequencies above the threshold. The three frequencies in this example are not necessarily grouped and reused as a group in other sectors, which can lead to different amounts of interference depending on how the frequencies are assigned to other sectors. It should be understood that this example is for purposes of illustration only, and the different regions need not be geographically contiguous as shown in the figure. The situation illustrated in FIG. 8 complicates the utilization of the above-noted standard Erlang B blocking calculation that assumes that all channels throughout the cell are available for use.

It is also desirable to define C/I(x) more precisely from a set of different C/I(x,f), where f is a frequency of the sector in which x lies. The following are examples of two different approaches that may be used to accomplish this purpose.

The first approach uses an average value of the different C/I values:

C/I(x)=average of all different C/I values for different frequencies of sector.

This definition of C/I(x) may then be plugged into Equation (2) in order to obtain coverage at a point x. An advantage of this approach is that the blocking computation is easy in that one can use the above-noted Erlang B formula. In effect, this approach assumes that if the average value is above threshold, then all the available channels are good at the point. It should be noted that this is an approximation that simplifies the calculations, and seems to be effective in simulations. This approach is also referred to herein as the average method.

The second approach is the following. A point is covered if it is able to place and hold a call under lightly loaded conditions. It is clear that under this criterion a point is covered if any one of the C/I values is above threshold (of course C also has to be above threshold). In this approach, C/I(x) is defined as follows:

C/I(x)=max of all different C/I values for different frequencies of sector.

This approach is also referred to herein as the max frequency method. A disadvantage of this approach is that it is no longer a good approximation to say that the blocking is given by the Erlang B formula. This is because not all points that are covered have access to all the channels. The blocking computation under this approach can be modeled as a precise mathematical problem in queuing theory. However, there are no good analytical solutions available for this problem and it is known to be computationally hard. In addition, derivatives of the blocking with respect to the antenna parameters would generally be required in order to use continuous optimization methods and this makes the problem even harder.

In view of the above-noted difficulties, various approximations can be used to facilitate computation of the blocking using the max frequency method. As a first approximation, one can simply assume that all channels are available at all covered points, which allows use of the Erlang B formula. A second approximation is to compute tighter lower bounds on the blocking using more sophisticated techniques. For this purpose, several lower bounds have been developed and compared, based on both absolute lower bounds and specific algorithms that could be adopted at the base station, in terms of their analytical computability and via simulations. Based on these results, it appears preferable to utilize a lower bound from a linear programming formulation, i.e., a linear program based bound. Heuristics can be used to approximate the linear program based bound since it is generally expensive to compute it. The value obtained is a lower bound on the actual blocking of the sector but is usually a much better approximation than using the simple Erlang B formula.

The above-described network optimization process can be used to generate an actual design of a network not yet built or configured, to make an adjustment in an existing network, to determine operating parameters for an operating network, or for other purposes. One or more network parameters are thus determined or adjusted based on the output of the optimization process of the present invention.

The graphical displays of FIGS. 2, 5, 6 and 7 may be generated in accordance with, e.g., software program instructions executed by processor 12 of system 10. An appropriately-configured software program in accordance with the invention may, e.g., obtain network parameter data from one or more sources, process the network parameter data in accordance with the optimization process of the invention, and generate a display which plots the resulting network configuration information in a desired format.

The above-described embodiments of the invention are intended to be illustrative only. For example, as previously noted, the above-described techniques can be used to design a wireless network, or to optimize or otherwise improve an existing network that is already under operation. In addition, the invention can be applied to sub-networks, e.g., to designated portions of a given wireless network, and to many different types of networks, e.g., networks with mobile subscriber units or fixed subscriber units or combinations of mobile and fixed units. In addition, although the illustrative embodiment of the invention utilized a three-stage optimization process, other embodiments may utilize more or fewer stages. For example, the pre-frequency-assignment optimization process described herein may be utilized independently with any type of conventional frequency assignment, and without a post-frequency-assignment optimization stage. As another example, the frequency assignment and post-frequency-assignment optimizations stages may be utilized without the pre-frequency-assignment optimization, and with a specified number of iterations. These and numerous other alternative embodiments within the scope of the appended claims will be readily apparent to those skilled in the art.

What is claimed is:

1. A processor-implemented method for providing a desired level of performance for a wireless network, the method comprising the steps of:

applying an optimization process to a set of information characterizing the network, the optimization process comprising at least a pre-frequency-assignment optimization stage, the pre-frequency-assignment optimization stage being applied prior to assignment of frequencies to one or more communication channels of the wireless network; and utilizing an output of the optimization process to determine at least one operating parameter of the wireless network.

2. The method of claim 1 wherein the optimization process further comprises a multi-stage optimization process having at least the pre-frequency-assignment optimization stage followed by a frequency assignment stage.

3. The method of claim 2 wherein the pre-frequency-assignment optimization stage and the frequency assignment stage are repeated in an iterative manner.

4. The method of claim 2 wherein the frequency assignment stage comprises a frequency planning stage.

5. The method of claim 1 wherein the wireless network implements a frequency reuse factor greater than one.

6. The method of claim 1 wherein the wireless network comprises at least one of a TDMA wireless network, an FDMA wireless network, a CDMA wireless network, an OFDM wireless network, and a TDD wireless network.

7. The method of claim 1 wherein the optimization process utilizes a derivative-based optimization of a specified objective function.

8. The method of claim 1 wherein the operating parameter of the wireless network comprises at least one of a base station transmit power and an antenna orientation.

9. The method of claim 1 wherein the optimization process determines a network configuration for specified values of network capacity and network coverage.

10. The method of claim 1 wherein the optimization process generates a graphical display in the form of a tradeoff curve of capacity versus coverage.

11. The method of claim 1 wherein the optimization process generates a graphical display in the form of a tradeoff curve of percent carrier-to-interference ratio above threshold versus coverage.

12. The method of claim 1 the optimization process generates a graphical display in the form of a set of tradeoff curves comprising one or more tradeoff curves for each of a plurality of frequency plans.

13. The method of claim 1 wherein the optimization process assumes a particular frequency pattern in order to compute corresponding co-channel and adjacent-channel interference.

14. The method of claim 1 wherein the optimization process assumes a certain probability of co-channel and adjacent-channel likelihood in order to compute corresponding co-channel and adjacent-channel interference.

15. The method of claim 1 wherein the optimization process assumes that, for each of a plurality of sectors having more than one frequency, a carrier to interference ratio of every frequency at a given position in that sector is the same.

16. The method of claim 1 wherein a number of frequencies per cell sector of the wireless system is known prior to the application of the optimization process, and the process assumes that at least one sector has a different probability of being a co-channel interferer than other sectors.

17. The method of claim 1 wherein a number of frequencies per cell sector of the wireless system is unknown prior to the application of the optimization process and all cells are assumed to have the same number of frequencies, and the process assumes that at least one sector has a different probability of being a co-channel interferer than the other sectors.

18. The method of claim 1 wherein the optimization process weights interference of each of a plurality of sectors of the system relative to a specified wanted sector by a probability and then sums the weighted interferences.

19. The method of claim 1 wherein the optimization process adjusts a probability of a particular system sector being a co-channel or adjacent-channel interferer so as to normalize a level of interference.

20. The method of claim 1 wherein an excluded sector or sectors having a zero probability of being a co-channel sector, relative to a given wanted sector in which is located a mobile station for which interference is to be calculated, comprise one or more sectors co-located with the wanted sector in a cell of the network and one or more first-adjacent sectors.

21. The method of claim 1 wherein the optimization process defines a carrier to interference ratio for a given position within the network as an average of a set of carrier to interference ratios for different frequencies of the corresponding sector of the network.

22. The method of claim 1 wherein the optimization process defines a carrier to interference ratio for a given position within the network as a maximum of a set of carrier to interference ratios for different frequencies of the corresponding sector of the network.

23. An apparatus for use in providing a desired level of performance for a wireless network, the apparatus comprising:

a processor-based system operative to apply an optimization process to a set of information characterizing the network, the optimization process comprising at least a pre-frequency-assignment optimization stage, the pre-frequency-assignment optimization stage being applied prior to assignment of frequencies to one or more communication channels of the wireless network;

wherein an output of the optimization process is utilized to determine at least one operating parameter of the wireless network.

24. An apparatus for use in providing a desired level of performance for a wireless network, the apparatus comprising:

means for applying an optimization process to a set of information characterizing the network, the optimization process comprising at least a pre-frequency-assignment optimization stage, the pre-frequency-assignment optimization stage being applied prior to assignment of frequencies to one or more communication channels of the wireless network; and means for utilizing an output of the optimization process to determine at least one operating parameter of the wireless network.

25. An article of manufacture comprising a machine-readable medium for storing one or more software programs for use in providing a desired level of performance for a wireless network, wherein the one or more programs when executed by a processor-based system perform the step of:

applying an optimization process to a set of information characterizing the network, the optimization process comprising at least a pre-frequency-assignment optimization stage, the pre-frequency-assignment optimization stage being applied prior to assignment of frequencies to one or more communication channels of the wireless network;

wherein an output of the optimization process is utilized to determine at least one operating parameter of the wireless network.

* * * * *